Figure 1:
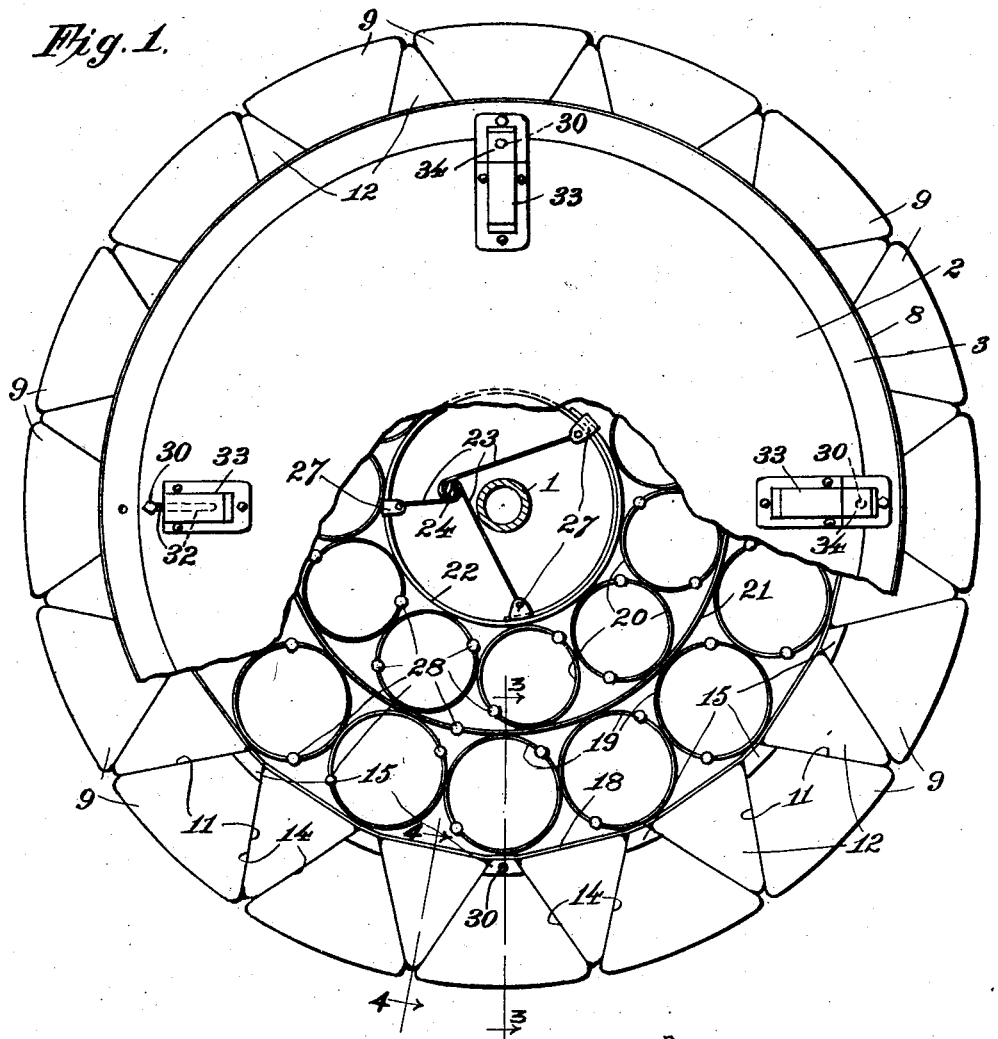

Aug. 30, 1927.

L. P. MILLER

RESILIENT WHEEL

Filed Feb. 21, 1927

1,640,613

3 Sheets-Sheet 1

Inventor
Lawrence P. Miller

By Joshua R. H. Potts
Attorney

Aug. 30, 1927. 1,640,613
L. P. MILLER
RESILIENT WHEEL
Filed Feb. 21, 1927 3 Sheets-Sheet 2
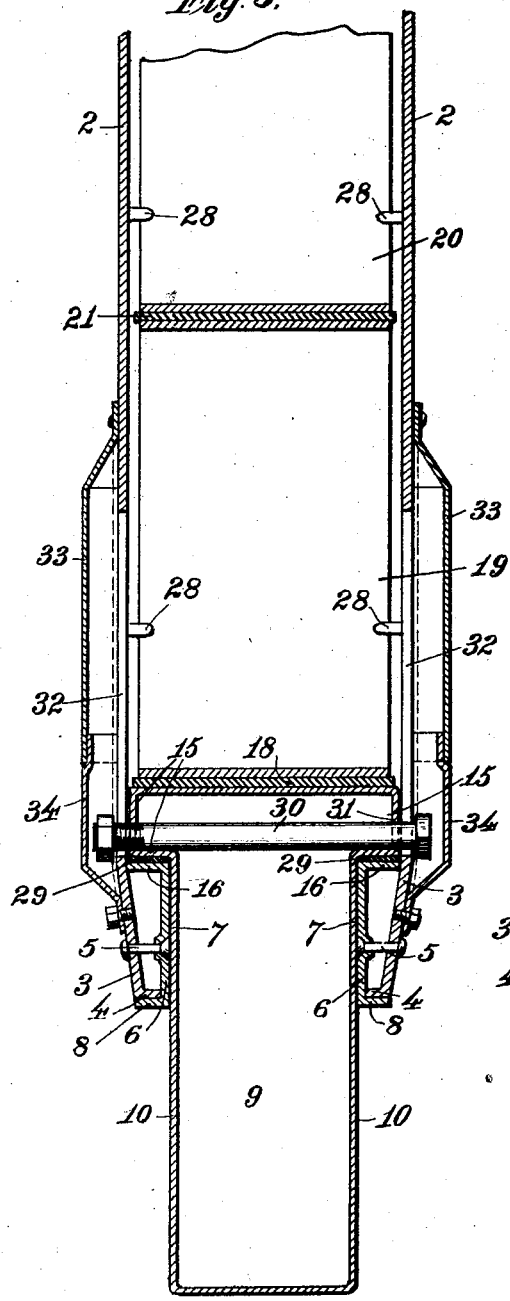
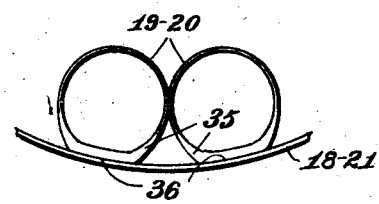
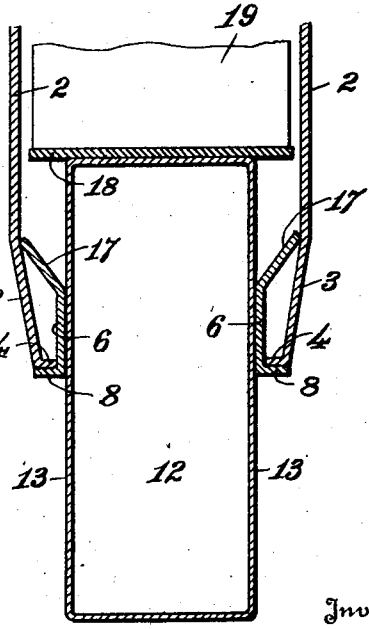
Inventor
Lawrence P. Miller.
By Joshua R. H. Potts
Attorney Aug. 30, 1927.
L. P. MILLER
1,640,613
RESILIENT WHEEL
Filed Feb. 21, 1927
3 Sheets-Sheet 3
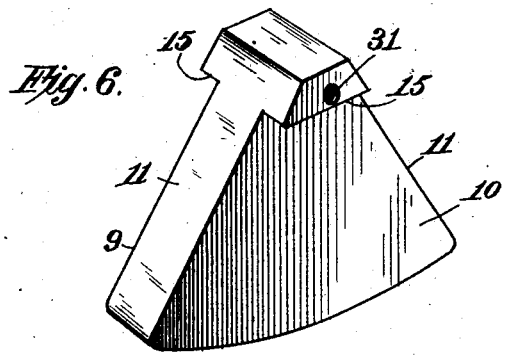
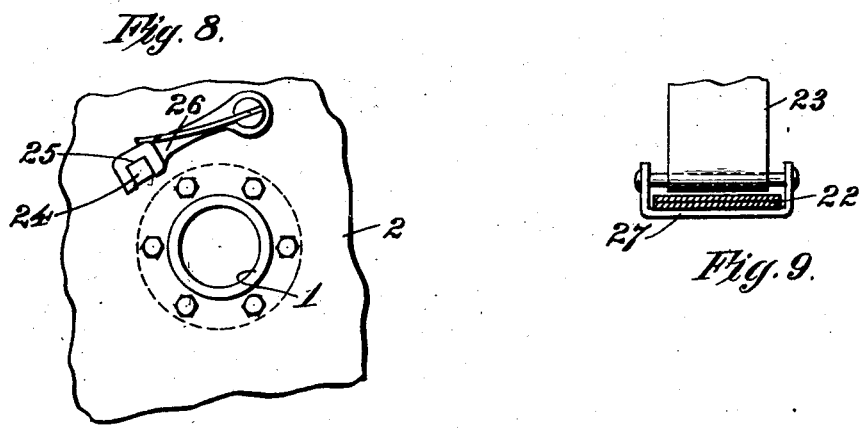
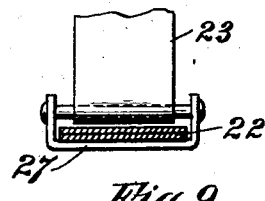
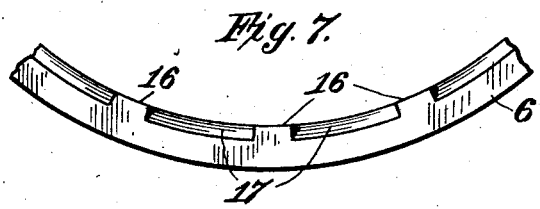
Inventor
Lawrence P. Miller
By Joshua R H Potts
Attorney Patented Aug. 30, 1927.

1,640,613

UNITED STATES PATENT OFFICE.

LAWRENCE PAXTON MILLER, OF PHILADELPHIA, PENNSYLVANIA.

RESILIENT WHEEL.

Application filed February 21, 1927. Serial No. 169,846.

My invention relates to wheels and particularly to resilient wheels for vehicles.

The object of my invention is to provide a resilient vehicle wheel which will dispense with the use of pneumatic or cushion tires and yet provide ample resiliency. A further object of my invention is to provide a wheel as mentioned in which the degree of resiliency of the device may be adjusted to suit the conditions under which the same is used. A further object of my invention is to provide a device as mentioned in which the means for adjusting the degree of resiliency of the wheel may also be utilized for facilitating the assembling or disassembling of the parts for replacement or repair. A further object of my invention is to provide in a wheel having a deformable tread, means whereby the recoil of the tread elements will be largely controlled by the co-operation of said tread elements. Further objects of my invention are to provide a wheel as mentioned which shall be neat in appearance and one which shall not readily get out of order.

With these objects in view my invention consists generally in a wheel comprising a hub and spaced disks secured thereto, a series of oppositely disposed wedge blocks arranged between the peripheral edges of said disks and projecting beyond the same to form a tread for the wheel, and means for exerting yielding pressure on the blocks to normally force the same radially outwardly. The resilient means for exerting yielding pressure on the tread elements preferably comprise a plurality of concentric series of circular spring members, there being an interposed circular spring element between the adjacent series, and a circular flexible element between the outer series and the inner ends of the tread blocks. My invention further consists in a device as mentioned further characterized by a split ring spring member arranged within and impinging against the inner series of spring elements and spaced from the hub of the wheel, whereby the pressure on the bottom tread members will be transmitted throughout the entire series of resilient elements and to the opposite side of the wheel without being transmitted directly on the hub. My invention further consists in a wheel as mentioned in combination with means for contracting the said inner split ring element or for permitting expansion of the same so as to adjust the tension of the spring elements, thereby regulating the resilience of the wheel to suit the same to the purpose for which it is to be used. My invention further consists in a wheel having a deformable tread comprising a series of inwardly tapered blocks and a series of oppositely tapered blocks fitting between the latter, and means for limiting the outward movement of the tread blocks, the friction between the adjacent co-operating faces of the oppositely disposed wedge blocks serving in a large measure to control the recoil of the tread elements. My invention further consists in various details of construction and combination of parts all as will be fully described hereinafter and particularly pointed out in the claim.

My invention will be more readily understood by reference to the accompanying drawings forming a part of this specification and in which—

Figure 2:
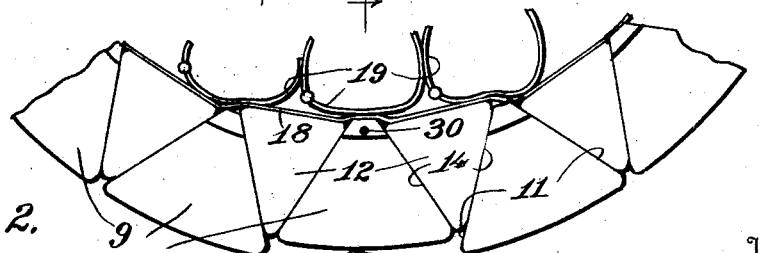

Fig. 1 is a side elevation of a resilient wheel embodying my invention, parts being broken away to illustrate the construction, Fig. 2 is a detail view illustrating the action of the tread elements when encountering an unevenness in the road, Fig. 3 is a section on the line 3—3 of Fig. 1 upon an enlarged scale, Fig. 4 is a similar section on the line 4—4 of Fig. 1, Fig. 5 is a detail view of a modified form of the spring elements, Fig. 6 is a detail perspective view of one of the outer block tread elements, Fig. 7 is a detail elevation of a portion of a wear plate used in the construction of the device, and Figs. 8 and 9 are details of portions of the tension adjusting means.

Referring now to the drawings 1 indicates the hub of a wheel to which are secured a pair of disks 2—2 forming the body of the wheel. The peripheries of the disks 2 are preferably bent inwardly at a slight angle, as at 3, terminating in an inwardly extending flange 4. Arranged within the peripheries of each of said disks, and secured in any suitable manner, as by rivets 5, are annular wear plates 6, which present parallel faces 7 between which the tread elements, hereinafter described, are arranged. These annular wear plates are preferably provided with outwardly extending flanges 8 on their peripheries, which overlie the flanges 4 of the body disks of the wheel, thereby reinforcing and protecting the edges of said disks. The inner edges of the wear plates are bent outwardly to abut the inner faces of the disks as will be described more fully hereinafter.

The wheel is provided with a deformable tread, which consists of a plurality of wedge shaped tread blocks 9. These blocks have parallel sides 10 and inwardly converging edges 11. Arranged between the inwardly tapered blocks is a series of outwardly tapered blocks 12 having parallel side faces 13 and the inclined edges 14 frictionally engaging the edges 11 of the blocks 9. Means, hereinafter described, are provided for yieldingly forcing the tread blocks outwardly, therefore, means must be provided to limit the outward movement of the tread blocks. To this end, the blocks 9 are provided at their inner end with laterally extending lugs or bosses 15, which engage seats 16 formed by the outwardly turned inner edges of the wear plates 6. These inturned edges, adjacent the bosses 15 of the members 9, are preferably at substantially right angles to the face of the wear plate as shown in Figs. 3 and 7; whereas intermediate these portions of the device and adjacent the other blocks, the edges are inclined as indicated at 17 in Figs. 4 and 7. As stated the portions 16 are arranged to co-operate with the lugs 15 and it will be noted that the portions 17 are adjacent the inner wedge blocks 12. The outward movement of the wedge blocks 12 is limited by the blocks 9 and their inward movement is limited by the resilient means hereinafter described. Should for any reason the block 12 be forced inwardly until its outer end passes beyond the inner edge of the wear plate, it would be liable to tilt laterally, and engage the inner edge of said wear plate. For this reason, the adjacent portion of the inner edge of the wear plate is angularly disposed as at 17 so as to guide the member 12 back into normal position between the wear plates. Such lateral displacement of the members 9 could not take place on account of the lugs 15, which approximately engage the inner faces of the disks 2.

Resting upon the inner ends of the wedge blocks 9 and 12 is a flexible member 18, and impinging against this flexible element is the resilient means for yieldingly forcing the tread blocks outwardly. This comprises several series of circular spring members 19 and 20 and between the separate series of circular spring elements is an annular spring element 21. Impinging against the inner faces of the innermost spring elements 20 is a split ring 22 which is spaced from the hub 1. The ends of the split ring 22 overlap a considerable distance and means are provided for contracting the ring or permitting the same to expand. To this end, flexible elements 23 are secured to the split ring adjacent its ends and adjacent its center, the opposite ends of the flexible members being secured to an arbor 24 upon which the same may be wound. The outer end of the arbor is squared as indicated in Fig. 8 for the purpose of accommodating a wrench and for engagement by the retaining latch or dog 26, for holding the device in adjusted position. It is obvious that, by placing a wrench on the squared end 25, the arbor 24 may be turned to either contract or permit expansion of the split ring 22 after the latch 26 has been disengaged from the squared end. In this way, the tension of the resilient or spring elements may be adjusted to accommodate the wheel to the conditions under which it is to be used. To facilitate attaching the flexible members 23 to the spring, yokes 27 are attached to the split ring 22 and such a yoke is illustrated in detail in Fig. 9 of the drawings. To minimize the noise and lessen the friction between the disks 2 and the various spring elements 19, 20, and 21 said spring elements are provided with projections or lugs 28. These may be of any form but preferably are of babbitt or any other anti-friction metal. To prevent undue noise from the impact of the lugs 15 on the flanges 16, a cushioning element 29 is provided between the same.

It is desirable to provide means to prevent separating of the disks at their peripheries, and to this end I provide bolts 30 at intervals around the wheel. These extend through holes 31 provided for them in the inner ends of certain of the blocks 9 and work in slots 32 formed radially in the disks. These bolts also prevent peripheral creeping of the blocks with relation to the body of the wheel. To prevent dirt or other foreign matter entering through the slot 32, housings 33 are provided which cover the slots and provide spaces for the ends of the bolts. The outer ends 34 of the housings are removable to give access to the bolts 30.

In Fig. 5 I have illustrated a modified form of the spring elements 19 and 20, wherein the outer sides of the same are thickened as at 35 and formed with flattened faces 36. This strengthens the outer sides of the spring elements where the impact is most severe, prevents rotation of the spring elements, and thereby maintains them in their proper relative positions.

It will be noted that the tension adjusting mechanism 22 to 26 provides means for assembling and disassembling the parts, as by contracting the spring 22, the spring elements 19, 20 and 21 may be more readily removed and inserted. It is to be understood that when assembling these portions of the device one of the disks 2 is to be removed.

In operation, when the wheels strike an obstruction, as illustrated in Fig. 2, one or two of the outer tread blocks 9 is forced inwardly against the resiliency of the spring. This also forces inwardly the adjacent inner wedge blocks 12. After passing the obstruction, the wedge blocks are forced outwardly; and it should be borne in mind that the frictional engagement of the faces 11 and 14 controls this recoil in a large degree.

I claim:

1. In a resilient wheel, a deformable tread comprising a series of oppositely disposed alternately arranged movable wedge blocks, and means for exerting yielding pressure normally tending to force said blocks outwardly, substantially as described.

2. In a resilient wheel, a deformable tread comprising a series of oppositely disposed, alternately arranged movable wedge blocks, and means unconnected with said blocks for exerting yielding pressure on said blocks, substantially as described.

3. In a resilient wheel, a deformable tread comprising a series of oppositely disposed, alternately arranged movable wedge blocks, means for exerting yielding pressure on said blocks, and means on alternate blocks limiting the outward movement thereof, the intermediate blocks being retained by the first mentioned blocks, substantially as described.

4. In a resilient wheel, a deformable tread comprising a series of inwardly tapered wedge blocks, shoulders on said blocks, an abutment for said shoulders limiting the outward movement of the blocks, outwardly tapered blocks arranged between the first mentioned blocks, and means for exerting yielding pressure on said blocks, substantially as described.

5. In a resilient wheel a pair of annular wear plates having abutments thereon and a tread comprising a plurality of inwardly tapered wedge shaped blocks arranged between said wear plates and projecting beyond the same, said blocks having shoulders normally engaging said abutments, a series of outwardly tapered blocks arranged between the first said blocks, and means exerting yielding pressure outwardly on said blocks, substantially as described.

6. A resilient wheel comprising a pair of disks, a tread consisting of a plurality of tapered movable blocks arranged between the outer edges of the disks and projecting beyond the same, means exerting yielding pressure upon said blocks, tie members extending through certain of said movable blocks, and preventing spreading of the outer edges of the disks, substantially as described.

7. A device as set forth in claim 6 in which the tie members are fixed to the respective blocks and slidably connected to the disks, substantially as described.

8. A resilient wheel comprising a pair of disks, a tread consisting of a plurality of inwardly tapered blocks arranged between the outer edges of the disks, spacing members arranged between said blocks, means exerting yielding pressure on the blocks, tie members fixed to certain of said tread blocks, said disks being radially slotted to receive the ends of said tie members, substantially as described.

9. A device as set forth in claim 8 in combination with housings covering said slots and the ends of the tie members, substantially as described.

10. A device as set forth in claim 8 further characterized by housings covering said slots and the ends of the tie members, a portion of said housings being removable to give access to said tie members, substantially as described.

11. A device as set forth in claim 4 in combination with cushioning means between said shoulders and abutments, substantially as described.

12. A resilient wheel comprising a pair of spaced disks, wear plates arranged within the outer edges of said disks, a tread consisting of oppositely disposed alternately arranged wedge blocks arranged between said wear plates, and means exerting yielding pressure on said blocks, substantially as described.

13. A device as set forth in claim 12 in which said wear plates each comprises an annular member flanged at its inner edge forming abutments, and shoulders on certain of said blocks engaging said abutments to limit the outward movement of the blocks, substantially as described.

14. A resilient wheel comprising a pair of spaced disks, annular wear plates arranged within the outer edges of said disks, a tread consisting of oppositely disposed alternately arranged wedge blocks between said wear plates, and means exerting yielding pressure on said blocks; certain of said blocks being provided with shoulders and the inner edges of said wear plates each being provided with a flange, said flange adjacent said shoulders providing abutments for the same, and the portions of said flange intermediate said abutments and adjacent the other blocks being inclined, substantially as described.

15. In a resilient wheel a tread comprising a series of blocks, a flexible annular member engaging the inner ends of said blocks, a series of resilient members exerting outward pressure on said annular member and said blocks, and means for adjusting the tension of said resilient members, substantially as described.

16. A device as set forth in claim 15 in which the means for adjusting the tension comprises an inner split spring ring forming an inner abutment for the resilient members, and means for contracting or permitting expansion of said ring to adjust the tension of the resilient members on the blocks, substantially as described.

17. In a device of the class described a tread comprising a series of inwardly tapered members and a series of outwardly tapered members arranged alternately between the same, means for exerting yielding outward pressure on the tread elements, said means comprising a plurality of concentric series of circular spring members and an interpose spring element between the adjacent series, substantially as described.

18. A device as set forth in claim 17 in combination with a split spring ring arranged within and impinging against the inner series of spring members and means for contracting or permitting expansion of said split spring ring to regulate the tension on the tread members, substantially as described.

In testimony whereof I have signed my name to this specification.

LAWRENCE PAXTON MILLER.